United States Patent
Chamberlain et al.

(10) Patent No.: US 10,401,255 B1
(45) Date of Patent: Sep. 3, 2019

(54) VACUUM LEAK TESTING

(71) Applicant: LACO Technologies, Inc., Salt Lake City, UT (US)

(72) Inventors: Paul Chamberlain, Holladay, UT (US); Matthew Chamberlain, Centerville, UT (US)

(73) Assignee: LACO TECHNOLOGIES, INC., Salt Lake City, UT (US)

( * ) Notice: Subject to any disclaimer, the term of this patent is extended or adjusted under 35 U.S.C. 154(b) by 256 days.

(21) Appl. No.: 15/380,601

(22) Filed: Dec. 15, 2016

Related U.S. Application Data

(60) Provisional application No. 62/268,162, filed on Dec. 16, 2015.

(51) Int. Cl.
*G01M 3/26* (2006.01)
*G01M 3/28* (2006.01)
*G01M 3/20* (2006.01)

(52) U.S. Cl.
CPC .............. *G01M 3/26* (2013.01); *G01M 3/205* (2013.01); *G01M 3/2815* (2013.01)

(58) Field of Classification Search
CPC ............ G01M 3/26; G01M 3/00; G01M 3/32; G01M 3/20; G01M 3/205; G01M 3/2815
See application file for complete search history.

(56) References Cited

U.S. PATENT DOCUMENTS

| | | | | |
|---|---|---|---|---|
| 3,027,753 A | * | 4/1962 | Harder, Jr. | G01M 3/027 428/69 |
| 4,320,653 A | * | 3/1982 | Bernhardt | G01M 3/34 73/40 |
| 4,409,817 A | | 10/1983 | Edwards, Jr. | |
| 4,426,876 A | * | 1/1984 | Kakumoto | G01M 3/229 209/526 |
| 8,544,315 B2 | | 10/2013 | Guazzo et al. | |
| 2010/0251805 A1 | * | 10/2010 | Lehmann | G01M 3/3281 73/49.3 |

* cited by examiner

*Primary Examiner* — Eric S. McCall
*Assistant Examiner* — Timothy P Graves
(74) *Attorney, Agent, or Firm* — Snell & Wilmer L.L.P.

(57) ABSTRACT

A leak test apparatus that includes a test chamber, a pressure transducer, a vacuum source, and a vapor trap. The test chamber may be configured to receive a test part and the pressure transducer may be coupled in fluidic communication to the test chamber. The vacuum source and the vapor trap may be coupled in fluidic communication to the test chamber. The vacuum source may be configured to draw a vacuum on the test chamber and the vapor trap may be configured to mitigate vapor off-gassing. A method for leak testing includes positioning a test part in a test chamber, evacuating the test chamber to a vacuum pressure with a vacuum source, mitigating vapor off-gassing with a vapor trap, and detecting a pressure rise in the test chamber.

19 Claims, 17 Drawing Sheets

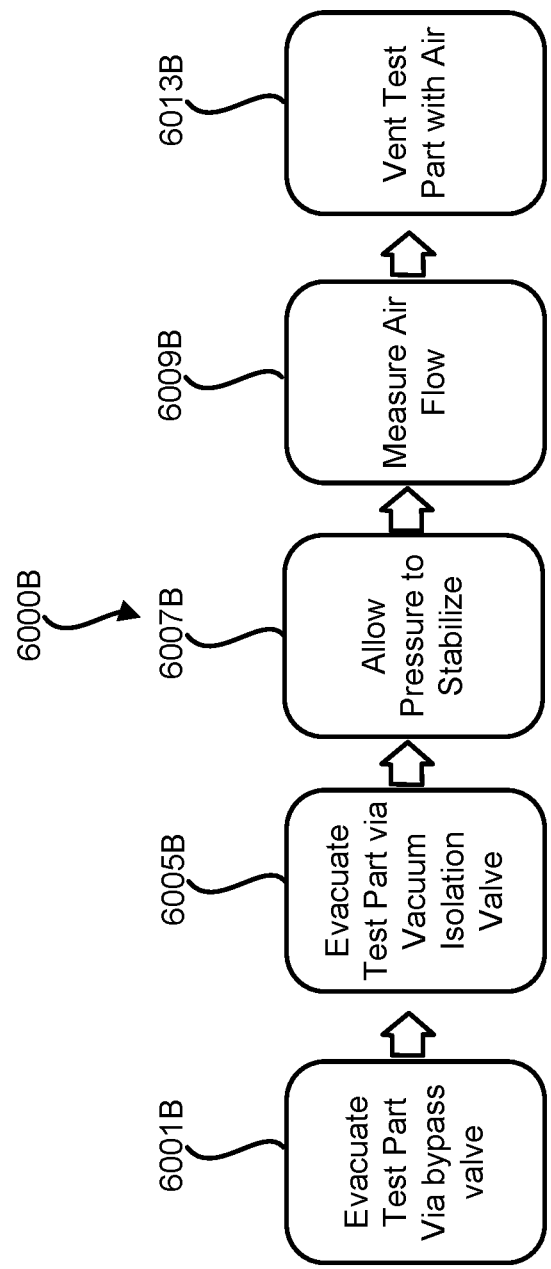

VACUUM LEAK TESTING

CROSS-REFERENCE TO RELATED APPLICATION

This application claims priority to, and the benefit of U.S. Provisional Application No. 62/268,162 filed Dec. 16, 2015, and entitled "LEAK TESTING UNDER VACUUM CONDITIONS," which is incorporated herein by reference in its entirety for all purposes.

FIELD

The present disclosure relates generally to leak testing, and more specifically to a method and apparatus for leak testing under vacuum conditions.

BACKGROUND

Manufactured parts often need to be tested for leaks. However, in various instances, leaks may be difficult to detect due to the nature of the part. As such, leaks may persist undetected in a manufactured part and may prevent the part from functioning properly.

SUMMARY

In various embodiments, the present disclosure provides a leak test apparatus. The leak test apparatus may include a test chamber, a pressure transducer, a vacuum source, and a vapor trap. The test chamber may be configured to receive a test part and the pressure transducer may be coupled in fluidic communication to the test chamber. The vacuum source may be coupled in fluidic communication to the test chamber and may be configured to draw a vacuum on the test chamber. The vapor trap may be coupled in fluidic communication to the test chamber and may be configured to mitigate vapor off-gassing.

Further disclosed herein, according to various embodiments, is a leak test apparatus that includes a pressure transducer in fluidic communication with an internal volume of a test part. A vacuum source and a vapor trap may be in fluidic communication with the internal volume of the test part. The vacuum source may be configured to draw a vacuum on the internal volume of the test part and the vapor trap may be configured to mitigate vapor off-gassing.

Also disclosed herein, according to various embodiments, is a method for leak testing. The method may include positioning a test part in a test chamber, evacuating the test chamber to a vacuum pressure with a vacuum source, mitigating vapor off-gassing with a vapor trap, and detecting a pressure rise in the test chamber.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 7B is another schematic flow chart diagram of a method for leak testing, in accordance with various embodiments;

DETAILED DESCRIPTION

Figure 1A:
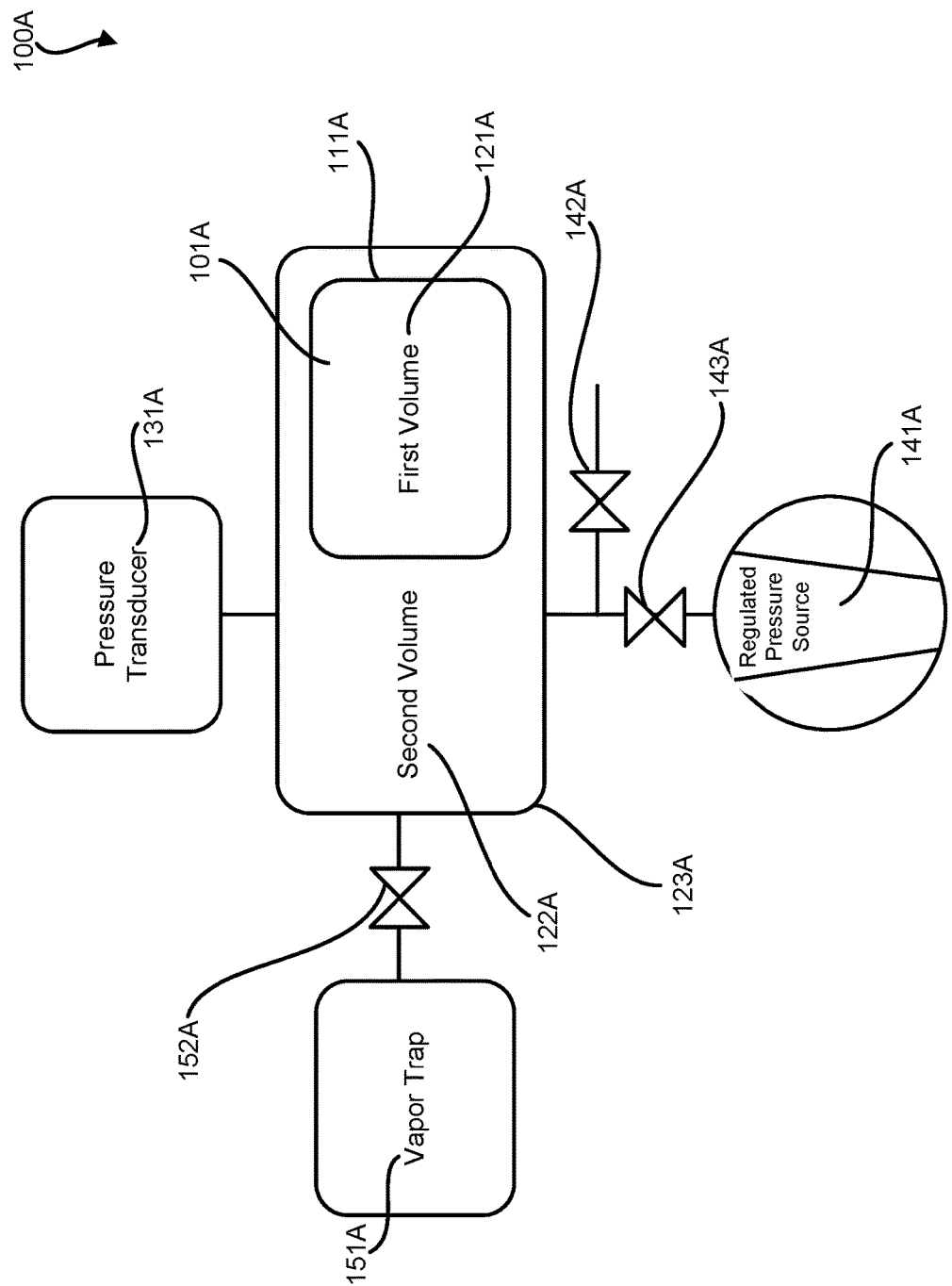
FIG. 1A is a schematic block diagram of an apparatus for leak testing, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation.

The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Pressure change leak test methods are used to leak test parts designed to contain/exclude a fluid. To perform the leak test, a positive or negative differential pressure is created with reference to the test part boundary using pressurized gas or vacuum. Once the differential pressure is created, the test volume is isolated, upon which a pressure change is measured using a pressure transducer. In general, a pressure decay (for a pressurized system) or pressure rise, also known as a vacuum decay, (for a vacuum system) indicates the presence of a leak in the test part. These tests differ greatly from tests that use a tracer gas to detect a leak in a test part.

Disclosed herein, according to various embodiments, is a leak test apparatus and its method of use. Generally, the leak test apparatus is a vacuum system and includes a vacuum source and a vapor trap. The vacuum source (e.g., a vacuum pump) may be configured to create a vacuum pressure to test the integrity/seal of a test part and the vapor trap may be configured to mitigate vapor off-gassing, as described in greater detail below.

In various embodiments, the test part may be completely sealed and the leak apparatus may include a test chamber that is configured to hold/receive the test part. In such embodiments, a pressure transducer, the vacuum source, and the vapor trap may be coupled in fluidic communication to the test chamber. As described below with reference to FIGS. 1A-B, 2A-B, and 8A-B, the connections between the test chamber and the pressure transducer, the vacuum source, and/or the vapor trap may have various configurations, arrangements, valves, circuits, etc, thus rendering the fluidic communications selectable.

In various embodiments, the test part may have a port or the internal volume of the test part may be otherwise accessible. In such embodiments, the test part may be directly tested via the port. In other words, an appropriate interface fixture or connector may be used to seal to the opening or connection port. The part may be pressurized or evacuated through this connection, then tested. That is, the pressure transducer, the vacuum source, and the vapor trap may be in fluid communication with the internal volume of the test part via the port. As described below with reference to FIGS. 3A-B, 4A-B, 6A-B, 7A-B, and 9A-B, the connections between the internal volume of the test part and the pressure transducer, the vacuum source, and/or the vapor trap may have various configurations, arrangements, valves, circuits, etc, thus rendering the fluidic communications selectable.

Test parts may be leak tested in a production environment where fast cycle times (high volume throughput) are desired. The cycle time may be made faster by having the internal walls of the test chamber be approximately conformal with the exterior of the part to be tested, thus reducing the amount of air that is removed from the chamber to draw the desired vacuum. But more than this, the vapor trap is configured to increase the pressure difference between a part with no leak and a part that is leaking (by mitigation of off gassing effects, as described herein), and this makes it possible to improve the reliability, conclusivity, and accuracy of leak identification tests and makes it possible to obtain conclusive test results more rapidly.

Additionally, part design criteria may require increasingly more sensitive leak test methods. The speed and sensitivity of pressure change leak test methods are affected by the size of the test volume, the stability of the part temperature and volume during the test, and the resolution of the pressure transducer, among other factors. In various embodiments, the change of pressure in the test volume may be a function of the change in absolute temperature (T) during the test, the rate of off-gassing vapors (Q'), the actual physical leak rate (Q), and the change of volume, if any, during the test (e.g., measured at times t1 and t2). In various embodiments, the volume (V) may be assumed to be constant and the temperature (T) may be assumed to be constant. Accordingly, the change in pressure in the test volume may generally be a function of the rate of off-gassing vapors (Q') and the actual physical leak rate (Q). By minimizing the rate of off-gassing vapors (Q') via the vapor trap, as mentioned above and as described in greater detail below, the correlation between the leak rate and the pressure change is strengthened. In other words, and according to various embodiments, reducing, preventing, minimizing, or otherwise mitigating the off-gassing vapor effect (Q') improves the test's reliability in correlating a detected pressure change with the presence of a leak.

In various embodiments, the leak test apparatus is configured to operate in various pressure/temperature ranges. For example, in various embodiments, the vacuum leak testing (e.g., pressure rise detection) may be performed at pressures below atmospheric pressure. In various embodiments, the vacuum pressure drawn by the vacuum source in the test chamber is between about 1.00 torr (133 pascal) and about 0.01 torr (1.33 pascal). In various embodiments, the vacuum pressure is between about 0.75 torr (100 pascal) and about 0.25 torr (33.3 pascal). In various embodiments, the vacuum pressure is about 0.50 torr (66.6 pascal). In various embodiments, the temperature of the test chamber or the internal volume of the test part of the leak test apparatus may be less than about −50 degrees Celsius. In various embodiments, the temperature may be between about −75 degrees Celsius and about −50 degrees Celsius. In various embodiments, the temperature may be less than about −60 degree Celsius. The temperature of the test chamber or the internal volume of the test part may be sensed, for example, using a thermocouple, such as a type K thermocouple, or any other suitable sensor.

In various embodiments, the lower the operating/vacuum pressure of the apparatus, the greater pressure change resolution may be achievable. That is, smaller pressure changes ($\Delta P/\Delta t$) may be detectable at low vacuum pressures, which may enhance the detection and measurement of smaller leaks, improving accuracy, precision, and reliability of the leak test apparatus. However, at these lower absolute pressures, many liquids or condensable vapors with vapor pressures above the vacuum level (absolute pressure) may off-gas into the gas phase. This source of gas may show up as a rise in pressure, potentially creating a false indication of a leak in a vacuum leak detection arrangement. Accordingly, the vapor trap mentioned above is configured to mitigate this off-gassing effect. In various embodiments, the vapor trap is configured to condense vapor from a substance (e.g., a liquid) present in the test chamber/test part. In various embodiments, the vapor trap is configured to freeze vapor from a substance (e.g., a solid) present in the test chamber/test part. Thus, the vapor trap may be configured to condense the condensable gases (such as water vapor) onto a cooled surface of the trap. The vapor trap may be further configured to not affect non-condensable gases. While additional details pertaining to the vapor trap are included below, the vapor trap generally reduces the pressure rise "noise" that would otherwise be caused by off-gassing, thus allowing for enhanced differentiation between pressure rise due to off-gassing and pressure rise due to a leak (see below with reference to FIG. 5). In this manner, the vapor trap increases the leak detection sensitivity of the overall apparatus.

Moreover, in various embodiments, the vapor trap has a purpose that is different from that of protecting the sensors or pumps. Thus, in various embodiments, the vapor trap is not connected in-line with the fluid flow between the test part and the pump. In one example embodiment, the vapor trap is connected in a T configuration (as described in more detail below). Thus, the vapor trap may be connected in a non-inline configuration. In other example embodiments, as described in more detail below, the vapor trap is connected in-line between the first volume and the regulated pressure source (pump), or is connected in-line with a bypass conduit such that initial pumping does not pass through the vapor trap, but only subsequent pumping passes through the vapor trap.

With specific reference to particularized aspects of the disclosure herein, in various embodiments, the vapor trap may be cooled by a refrigeration technique such as a helium compressor or a refrigeration compressor circuit. Moreover, the vapor trap may be cooled by the Peltier effect (Thermo-Electric Cooler). Furthermore, the vapor trap may use chemical or physical absorption mechanisms to trap vapors. Still further, the vapor trap may be cooled wherein the trapping surface is located inside, or is integrated into the surfaces of the leak test chamber. Moreover, the vapor trap may be any suitable device configured to condense condensable vapors. Thus, as one may appreciate from the discussion herein, the vacuum leak test apparatus disclosed herein may provide both improved sensitivity and accuracy to reduce the likelihood of a false positive leak identification.

The pressure transducer mentioned above may be of various technologies that are adequate to accurately sense small pressure changes under vacuum conditions, including capacitance diaphragm devices, piezo sensor devices, and thermal filament technologies, or any suitable device or sensor for accurately detecting pressure change under vacuum conditions. The vacuum source may be of various technologies adequate to create a deep enough vacuum. For example, the vacuum source may include oil-sealed and dry mechanical pump technologies, or any suitable system or device for drawing a vacuum. The operation of the various components (such as the vacuum source) and/or the actuation of the various valves may be regulated and/or controlled, according to various embodiments, by a controller. In various embodiments, the controller may include memory and the memory may include program code instructions for implementing the various methods and operations described herein.

In general, in an example embodiment, the test chamber may be defined by a housing that has internal walls/surfaces for surrounding a part to be tested inside the test chamber. The test chamber is configured to receive the part to be tested, and to seal the part to be tested within the test chamber. The test chamber is configured to be drawn down under vacuum to perform the leak test on the part. In an example embodiment, the internal walls/surfaces of the test chamber, or inserts therein may be specifically shaped to receive the test part. In other words, the test chamber may be specifically and uniquely manufactured for a unique part-type (e.g., an airbag component) and thus the test chamber may be repeatedly utilized to leak test individual parts of the part-type. In various embodiments, the test chamber may be configured to minimize volume/space between the walls of the test chamber and the test part. In such embodiments, the volume/space between the walls of the test chamber may be easily and quickly evacuated because of the reduced volume/space. Accordingly, the leak test apparatus of the present disclosure may not only improve the accuracy and reliability of leak test measurements, the leak test may be achieved rapidly, thus allowing more parts to be tested and/or reducing the cost of a leak detection system. For example, various steps of the leak test method disclosed herein, such as evacuating the test chamber to the vacuum pressure, mitigating vapor off-gassing with the vapor trap, allowing pressure to stabilize in the test chamber, and detecting the pressure rise in the test chamber may cumulatively take less than about 20 seconds to perform, thereby enabling parts to be rapidly tested and swapped out using the disclosed leak test apparatus.

Having generally disclosed the components of the leak test apparatus, specific attention is now directed to various arrangements, configurations, and/or fluidic connection schematics. For example, FIG. 1A depicts a leak testing apparatus 100A comprising a pressure transducer 131A in fluid communication with a second volume 122A within a test chamber 123A and containing a test part 101A comprising a first volume 121A bounded by a test part boundary 111A. The testing may be to determine if the test part boundary 111A is non-leaking.

The second volume 122A may be coupled in fluidic communication with a vapor trap 151A and a vacuum source 141A. In various embodiments, the fluid communication may be selectable in that one or more valves may be disposed between the second volume 122A and the vapor trap 151A and between the second volume 122A and the vacuum source 141A. For example, vapor trap isolation value 152A and vacuum isolation valve 143A may be disposed in fluid communication lines between the second volume/test chamber 122A/123A and the vapor trap 151A and the regulated pressure source 141A, respectively. In various embodiments, an external gas source, such as ambient air or an inert gas such as nitrogen, may be in fluid communication (e.g., selectable) via an air inlet valve 142A. Test chamber 123A may be configured such that the second volume 122A is hermetically sealed against the surrounding environment to prevent leaks into the second volume 122A. Test chamber 123A may further comprise a calibration leak port, and or a calibrated leak for use in calibration steps.

In various embodiments, FIG. 1A depicts a test part 101A that is sealed and has no connection port or opening, but is placed in a test chamber 123A. A vacuum is created in the second volume/test chamber 122A/123A by the vacuum source 141A and leakage is measured by monitoring the pressure rise with the pressure transducer 131A. During the leak measurement, the vapor trap 151A communicates with the second volume 122A to remove off-gassing vapors that may give a false leak indication.

Figure 1B:
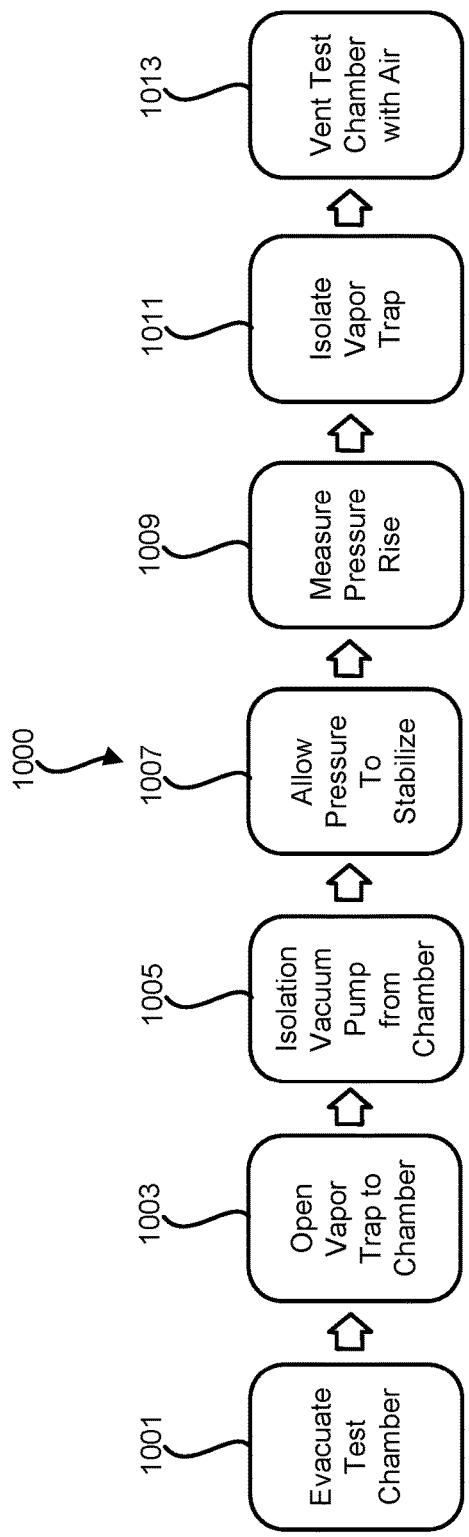
FIG. 1B is a schematic flow chart diagram of a method for leak testing, in accordance with various embodiments.

As such, as illustrated in FIG. 1B, a method 1000 of leak testing may include evacuating the test chamber 123A (for instance, a second volume 122A of the test chamber 123A) (step 1001). The method 1000 may further include opening the vapor trap isolation valve 152A so that the vapor trap 151A is in fluidic communication with the test chamber 123A may trap vapor therefrom (step 1003). The method 1000 may further include isolating the vacuum source 141A from the test chamber 123A by closing the vacuum isolation valve 143A (step 1005). In various embodiments, the pressure detected by the pressure transducer 131A is permitted to stabilize (step 1007) and a potential pressure rise is measured (step 1009) to determine if the test part has a leak. The method may further include isolating the vapor trap 151A using the isolation valve 152A (step 1011) and venting the test chamber 123A (step 1013), such as via the air inlet valve 142A. While the steps of the method 1000 may occur in different orders, in various embodiments the steps of the method 1000 occur in the order depicted (or at least each step is initiated in the order depicted).

Figure 2A:
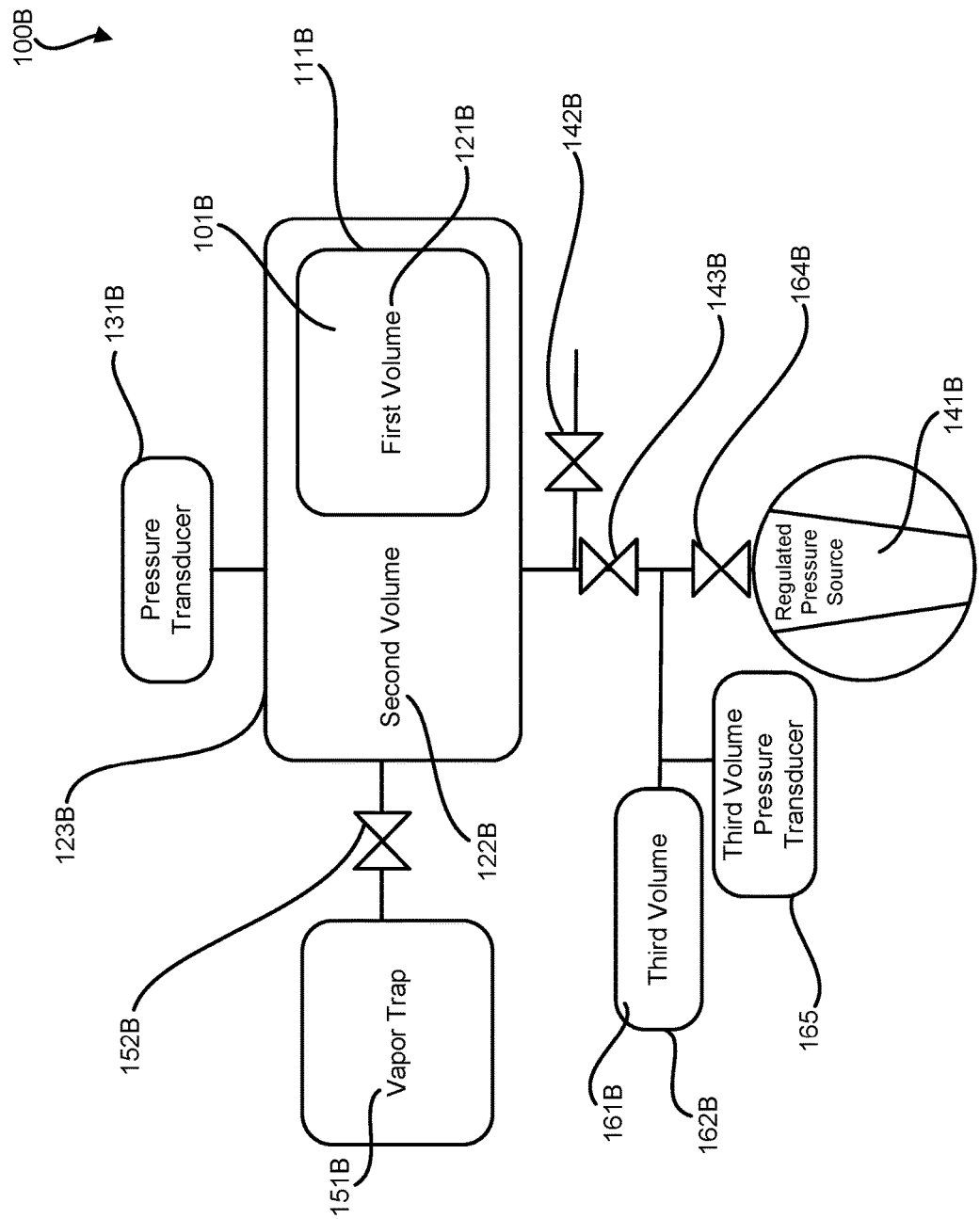
FIG. 2A is another schematic block diagram of an apparatus for leak testing, in accordance with various embodiments.
Figure 2B:
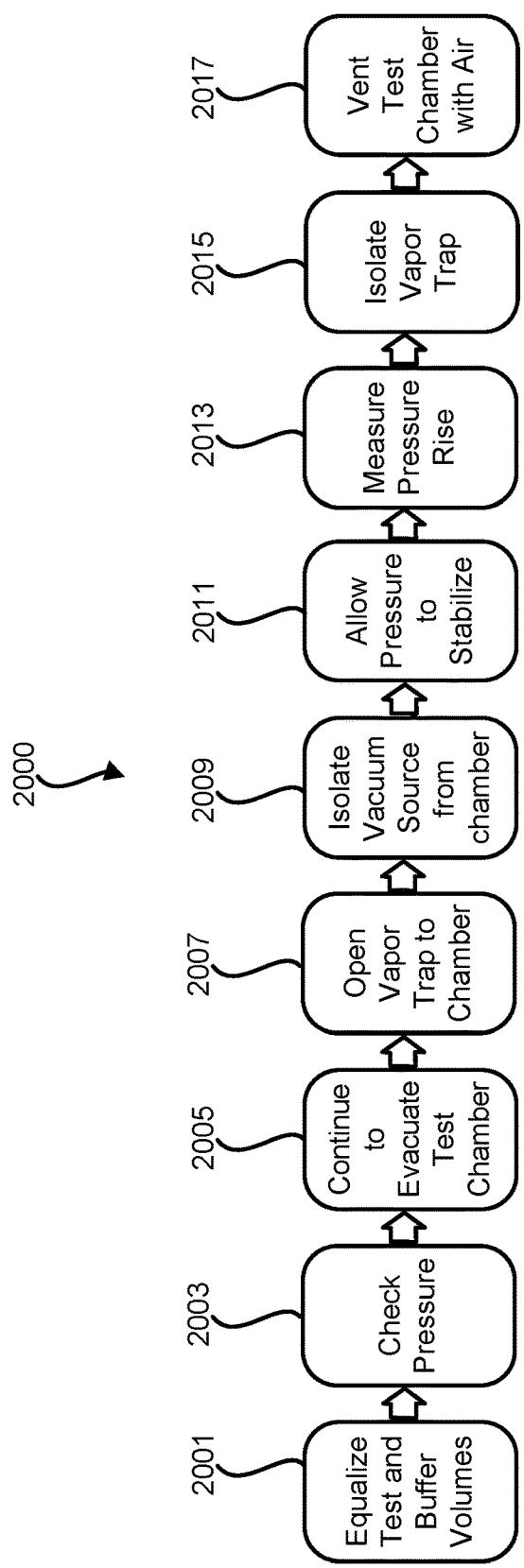
FIG. 2B is another schematic flow chart diagram of a method for leak testing, in accordance with various embodiments.

Now, turning attention to FIGS. 2A-B, the leak testing apparatus 100B may have features that are similar to FIG. 1A. For example, the pressure transducer 131B may be in fluid communication with the second volume 122B defined within the test chamber 123B and containing the test part 101B. The test part 101B may include a first volume 121B bounded by the test part boundary 111B. The second volume 122B may be in selectable fluidic communication with the vapor trap 151B via the vapor trap isolation value 152B and the second volume 122B may be in selectable communication with the vacuum source 141B and a third volume 161B (e.g., defined with a buffer tank 162B) via the vacuum isolation valve 143B. The second volume 122B may be in selectable communication with the external gas source, such as ambient air or nitrogen, via the air inlet valve 142B.

The third volume 161B may be coupled in selectable fluidic communication to the vacuum source 141B by a tank evacuation valve 164B. Moreover, an additional pressure transducer (third volume pressure transducer 165) may be in fluidic communication with the third volume 161B within the buffer tank 162B.

In various embodiments, the third volume 161B is pre-evacuated and the third volume 161B may be fluidly introduced to the second volume 122B for the purpose of identifying a potential gross leak from the test part 101B. This may be done by monitoring the resulting pressure in third volume 161B of the buffer tank 162B by the third volume pressure transducer 165 after the volumes are in communication with each other (e.g., fluidly combined via opening of valve 143B). By comparing the combined pressure to a condition where the first volume 121B is also in communication with the second volume 122B, it can be determined whether or not the test part has a gross leak. In other words, the resulting pressure will be different when all three volumes are in communication compared to when just the second and third volumes are in communication. The pressure comparison allows for identifying a gross leak in the test part 101B that might be masked, or not detected because the first volume 121B could be unintentionally evacuated during the evacuation step resulting in no differential pressure between the first and second volume required to perform the test. Once this gross leak test is performed, a test sequence proceeds similar to that of FIGS. 1A-B, according to various embodiments.

As such, FIG. 2B shows a schematic flowchart diagram of a method 2000 of leak testing that may include opening a volume equalization valve 143B (also referred to above as the vacuum isolation valve 143B) such that the pressure of the third volume 161B of the buffer tank 162A and the second volume 122B of the test chamber 123B may equalize (step 2001). The method may comprise checking the magnitude of this equalized pressure by a pressure transducer 131B (step 2003), then evacuating the volume by a vacuum source 141B connected to the buffer tank 162B and the test chamber 123B via a vacuum isolation valve 143B and a tank evacuation valve 164B (step 2005). Subsequently, the vapor trap 151B may be opened to the test chamber 123B via the trap isolation valve 152B (step 2007) and the vacuum source 141B may be isolated from the test chamber 123B by the vacuum isolation valve 143B (step 2009). Again, the pressure is permitted to equalize (step 2011) and subsequently a potential pressure rise is measured by the pressure transducer 131B indicating a potential leak from the first volume 121B to the second volume 122B (step 2013). Subsequently the vapor trap 151B may be isolated by the trap isolation valve 152B (step 2015) and the test chamber 123B vented via the air inlet valve 142B (step 2017). While the steps of the method 2000 may occur in different orders, in various embodiments the steps of the method 2000 occur in the order depicted (or at least each step is initiated in the order depicted).

Figure 8A:
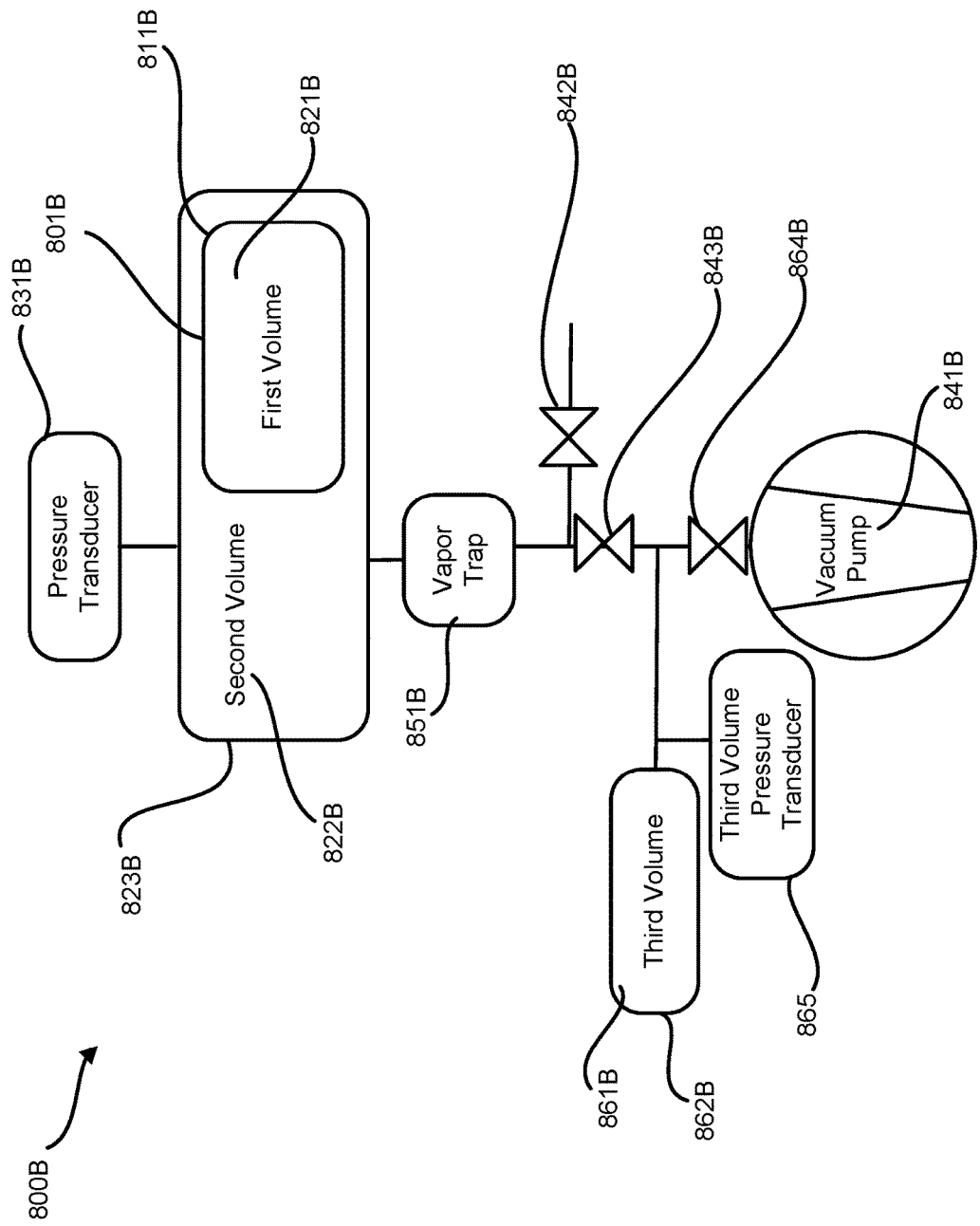
FIG. 8A is another schematic block diagram of an apparatus for leak testing, in accordance with various embodiments.
Figure 8B:
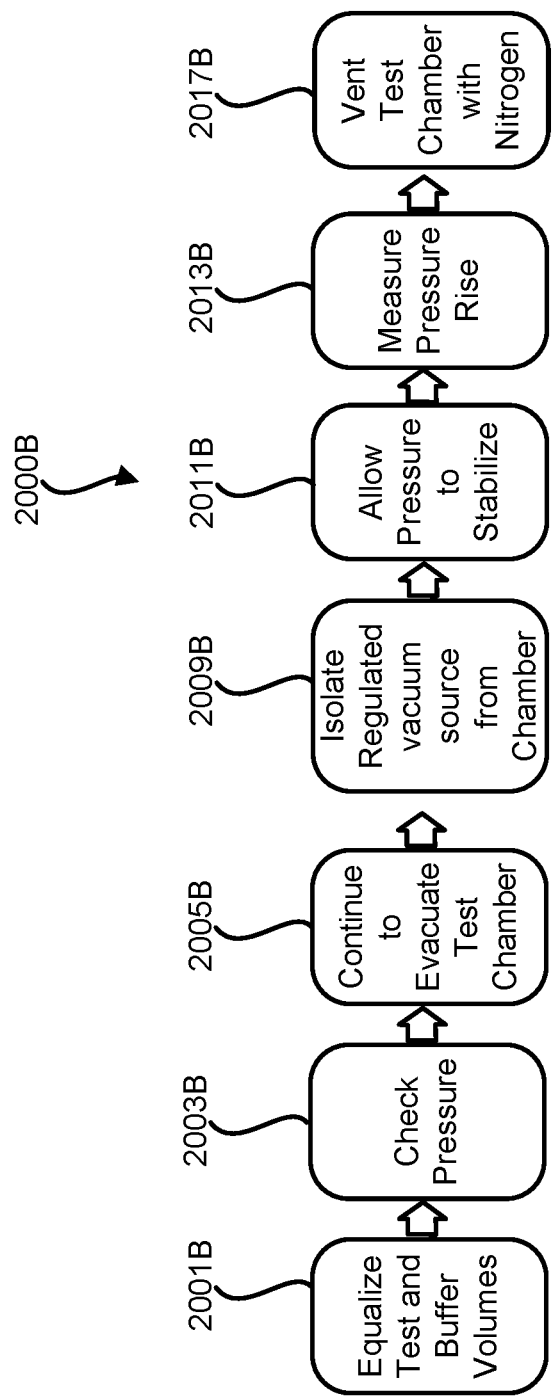
FIG. 8B is another schematic flow chart diagram of a method for leak testing, in accordance with various embodiments.

Now, turning attention to FIGS. 8A-B the leak testing apparatus 800B, according to various embodiments, includes the pressure transducer 831B in fluid communication with the second volume 822B within the test chamber 823B and containing the test part 801B having a first volume 821B bounded by the test part boundary 811B. The second volume 822B may be in selectable fluidic communication with the vacuum pump 841B and the third volume 861B defined by the buffer tank 862B via the vapor trap 851B. In other words, the procedures of combining the second volume 822B with the third volume 861B, as well as evacuating the second volume 822B, may occur via the vapor trap 851B.

The method 2000B depicted in FIG. 8B, according to various embodiments, includes opening valve 843B so that the pressure of the third volume 861B of the buffer tank 862B and the second volume 822B of the test chamber 823B may equalize (step 2001B). The method 2000B may include checking the magnitude of this equalized pressure by a pressure transducer 831B (step 2003B) and evacuating the second volume 822B (or the combined volume of 822B and 861B) by the vacuum source 841B. The second volume 822B being evacuated via the vapor trap 851B (step 2005B). The method 2000B may include isolating the vacuum source 841B from the second volume 822B of the test chamber 823B (step 2009B). The pressure is permitted to equalize (step 2011B) and subsequently a potential pressure rise is measured by the pressure transducer 831B indicating a potential leak from the first volume 821B to the second volume 822B (step 2013B). The test chamber 823B may then be vented via the air/nitrogen inlet valve 842B (step 2017B). While the steps of the method 2000B may occur in different orders, in various embodiments the steps of the method 2000B occur in the order depicted (or at least each step is initiated in the order depicted).

Figure 3A:
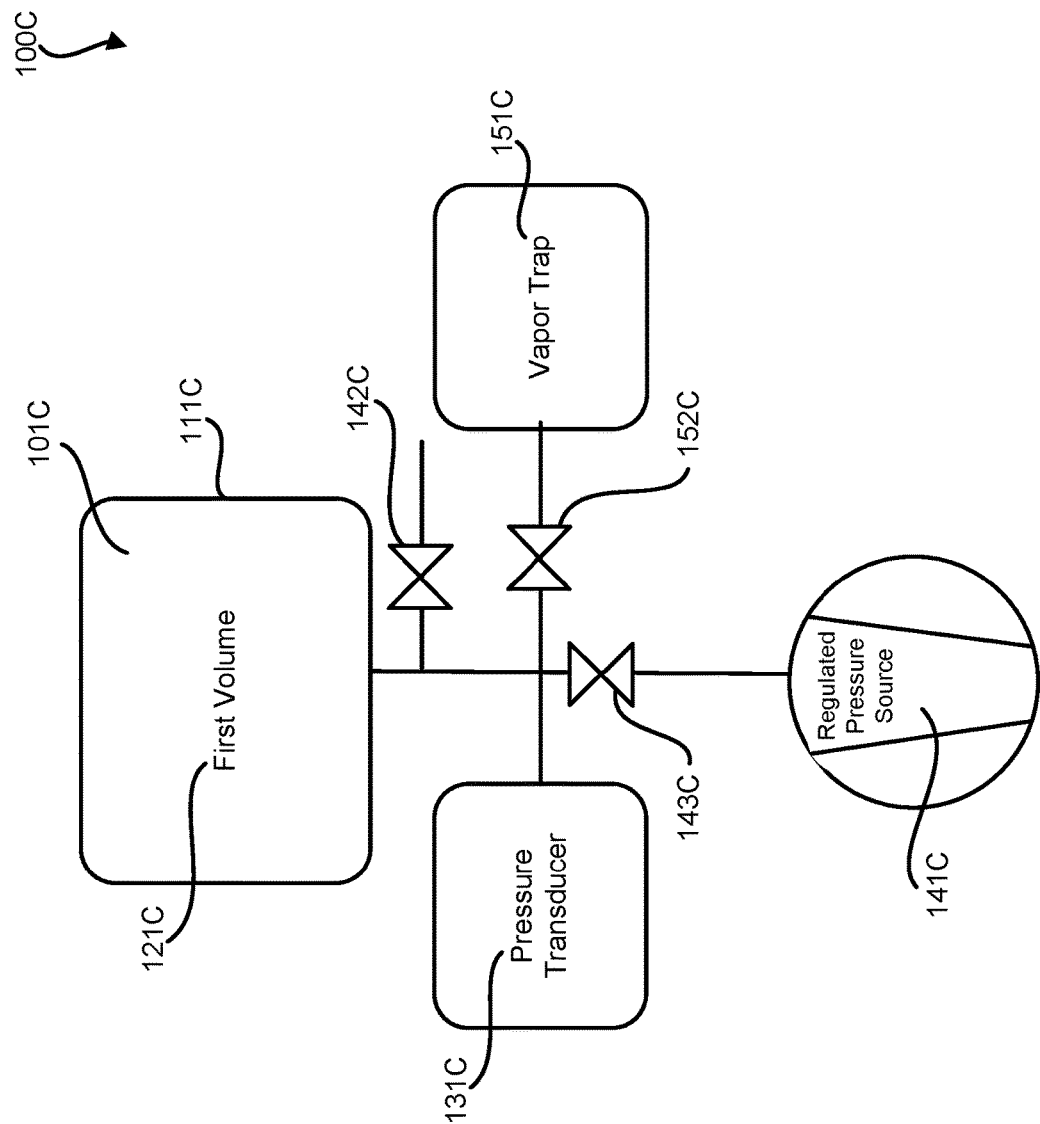
FIG. 3A is another schematic block diagram of an apparatus for leak testing, in accordance with various embodiments.

In various embodiments, and as mentioned above, the test part may not be completely sealed, but may have a connection port or opening that can be connected to for evacuation of the internal volume. In various embodiments, and with reference to FIGS. 3A-B, the internal volume 121C (e.g., first volume) of the part is directly vacuum tested instead of positioning the part within the intermediate volume that is the second chamber (e.g., the test chamber). FIG. 3A depicts the leak test apparatus having the pressure transducer 131C in fluid communication with the first volume 121C within the test part 101C bounded by the test part boundary 111C. The first volume 121C may be in selectable fluidic communication with the vapor trap 151C via vapor trap isolation value 152C, and selectable fluidic communication with a vacuum source 141C via the vacuum isolation valve 143C. The first volume 121C may also be in selectable communication with an external gas source, such as ambient air or nitrogen (among others), via an air inlet valve 142C.

Figure 3B:
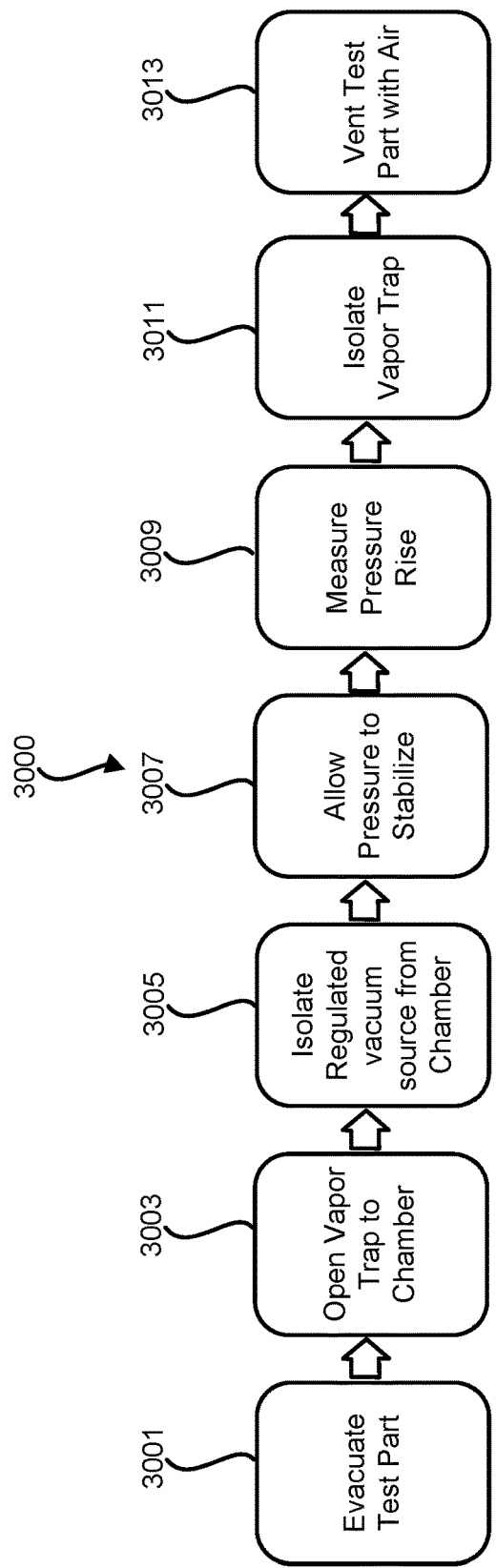
FIG. 3B is another schematic flow chart diagram of a method for leak testing, in accordance with various embodiments.

As such, as illustrated in FIG. 3B, a method of leak testing 3000 may comprise evacuating test part 101C via the vacuum source 141C connected to test part 101C via vacuum isolation valve 143C (step 3001). Subsequently, the vapor trap 151C may be opened to the test part 101C via the trap isolation valve 152C (step 3003) and the vacuum source 141C may be isolated from the test part 101C by the vacuum isolation valve 143C (step 3005). The pressure is permitted to stabilize (step 3007) and subsequently a potential pressure rise is measured by the pressure transducer 131B indicating a potential leak from the first volume 121C of the test part 101C (step 3009). Subsequently the vapor trap 151C may be isolated by the trap isolation valve 152C (step 3011) and the first volume 121C vented via the air inlet valve 142C (step 3013). While the steps of the method 3000 may occur in different orders, in various embodiments the steps of the method 3000 occur in the order depicted (or at least each step is initiated in the order depicted).

Figure 4A:
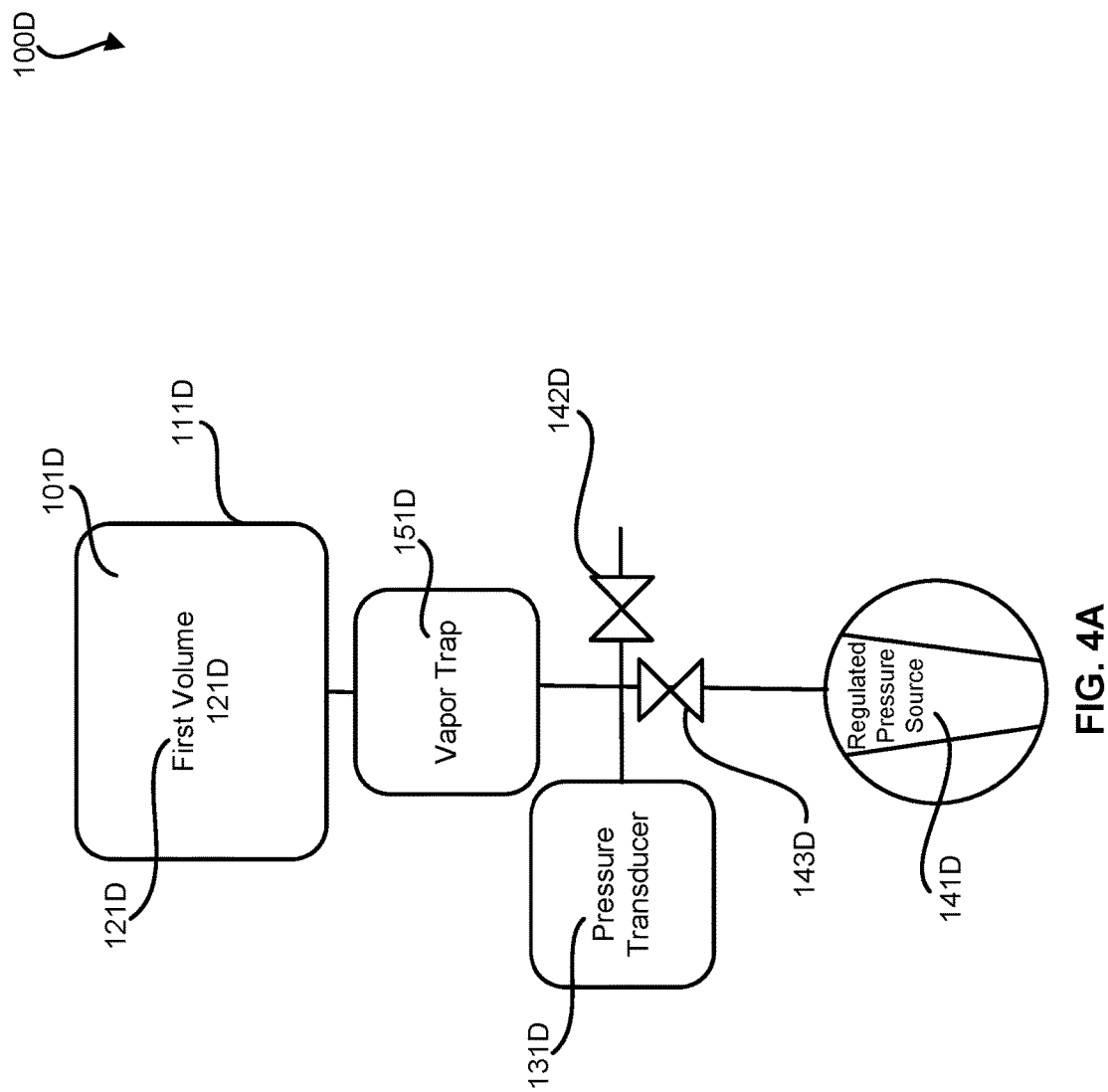
FIG. 4A is another schematic block diagram of an apparatus for leak testing, in accordance with various embodiments.
Figure 4B:
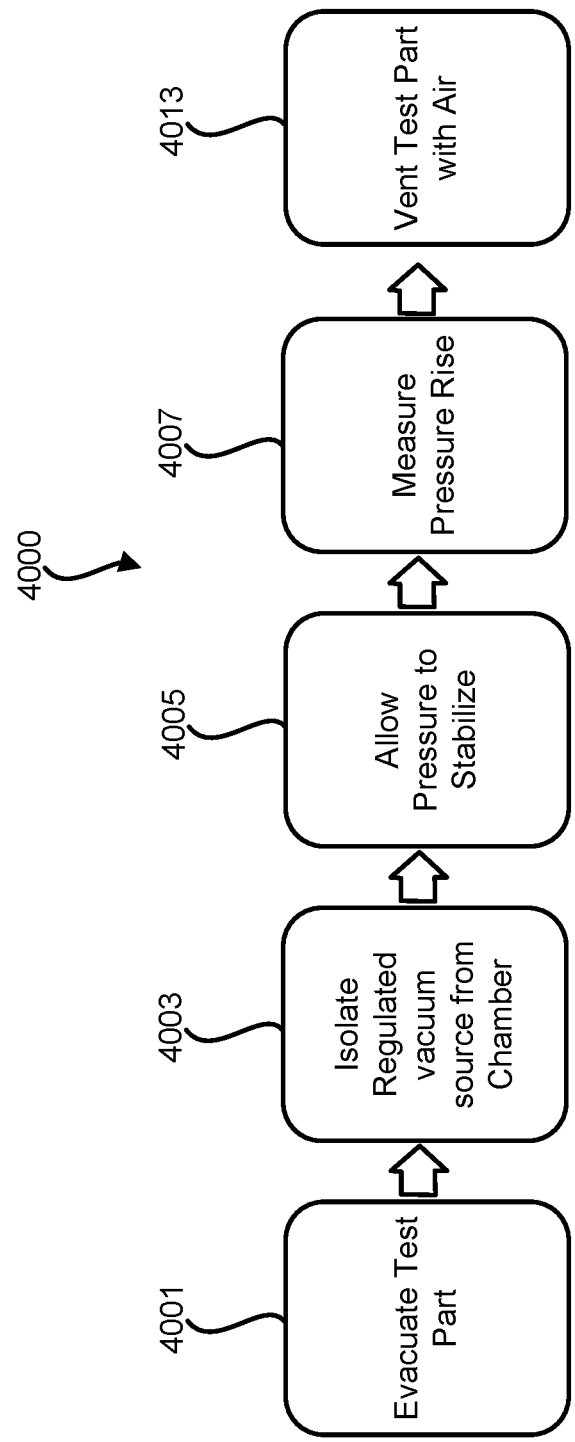
FIG. 4B is another schematic flow chart diagram of a method for leak testing, in accordance with various embodiments.

In various embodiments and with reference to FIGS. 4A-B, the leak testing apparatus 100D, which may be similar to leak test apparatus of FIG. 3A, has the vapor trap 151D located "in-line" with the connection between the test part 101D and the vacuum source 141D (e.g., the placement of the vapor trap may be similar to the configuration shown in FIG. 8A). The leak test apparatus 100D includes pressure transducer 131D in fluid communication with a first volume 121D within the test part 101D bounded by the test part boundary 111D. The first volume 121D may be in fluidic communication with a vapor trap 151D. The series combination of the first volume 121D and the vapor trap 151D may be in selectable communication with a vacuum source 141D via the vacuum isolation valve 143D. The series combination of the first volume 121D and the vapor trap 151D may be in selectable combination with an external gas source, such as ambient air, via an air inlet valve 142D.

According to various embodiments, and with reference to FIG. 4B, method 4000 includes evacuating the test part 101D via the vacuum source 141D connected to the test part 101D and vapor trap 151D via the vacuum isolation valve 143D (step 4001). The method 4000 may further include isolating the vacuum source 141D from the test part 101D by the vacuum isolation valve 143D (step 4003). The pressure can then be permitted to stabilize (step 4005) and subsequently a potential pressure rise can be measured by the pressure transducer 131D to determine the presence of a leak in the test part 101D (step 4007). The method 4000 may also include venting the test part with air/nitrogen (step 4013). While the steps of the method 4000 may occur in different orders, in various embodiments the steps of the method 4000 occur in the order depicted (or at least each step is initiated in the order depicted).

Figure 9A:
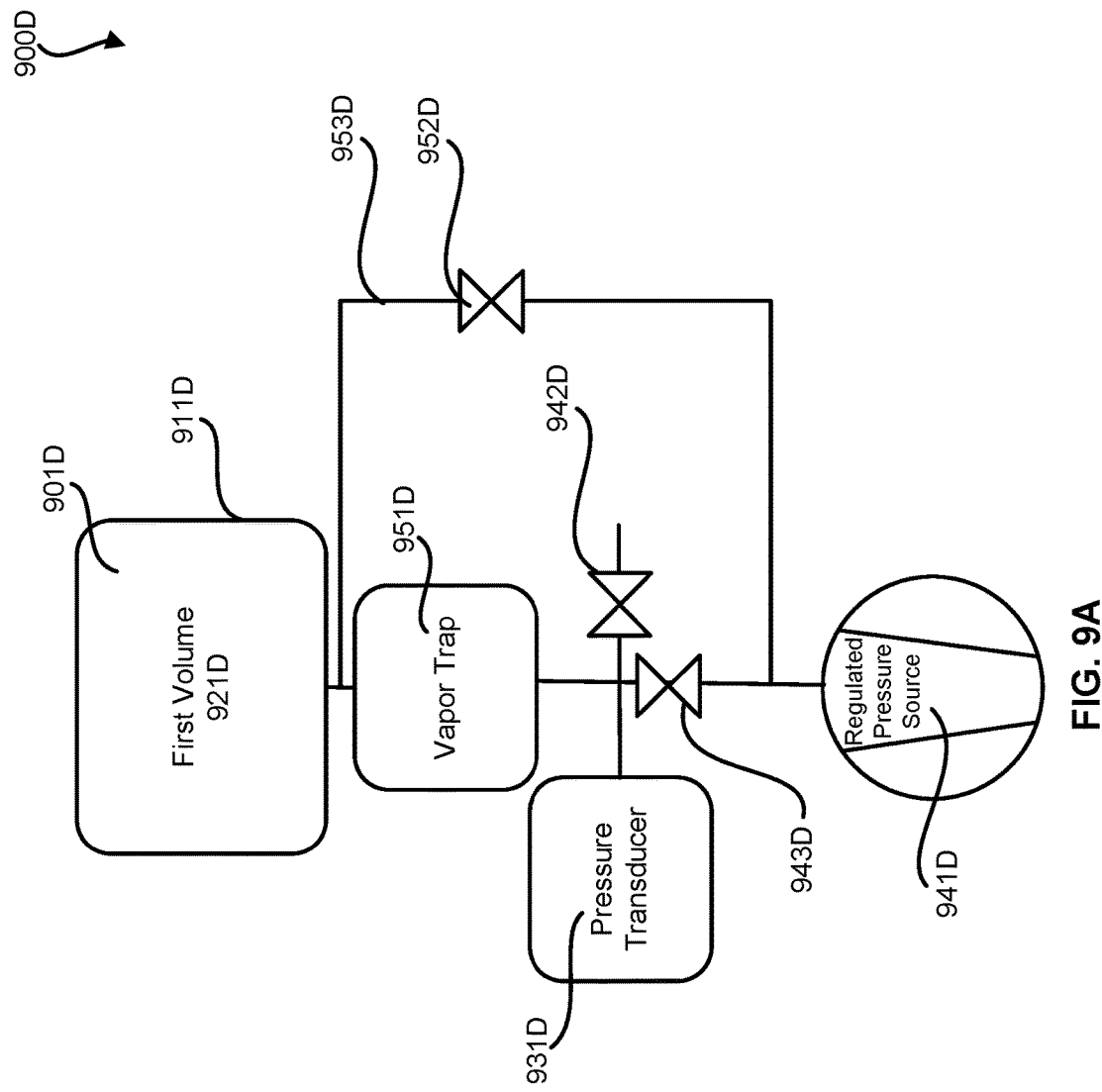
FIG. 9A is yet another schematic block diagram of an apparatus for leak testing, in accordance with various embodiments.

FIG. 9A, according to various embodiments, shows the leak test apparatus 900D having a bypass conduit 953D and a bypass valve 952D. As described above with reference to FIG. 4A, the vapor trap 951D is placed "in-line" with the connection between the test part 901D and the vacuum source 941D, but the apparatus 900D further includes the bypass conduit 953D that provides selectable fluidic communication between the first volume 921D and the regulated pressure source 941D that bypasses the vapor trap 951D (and may bypass the pressure transducer 931D). The air inlet valve 942D may be connected between and configured to provide air/nitrogen between the vapor trap 951D and the regulated pressure source 941D.

Figure 9B:
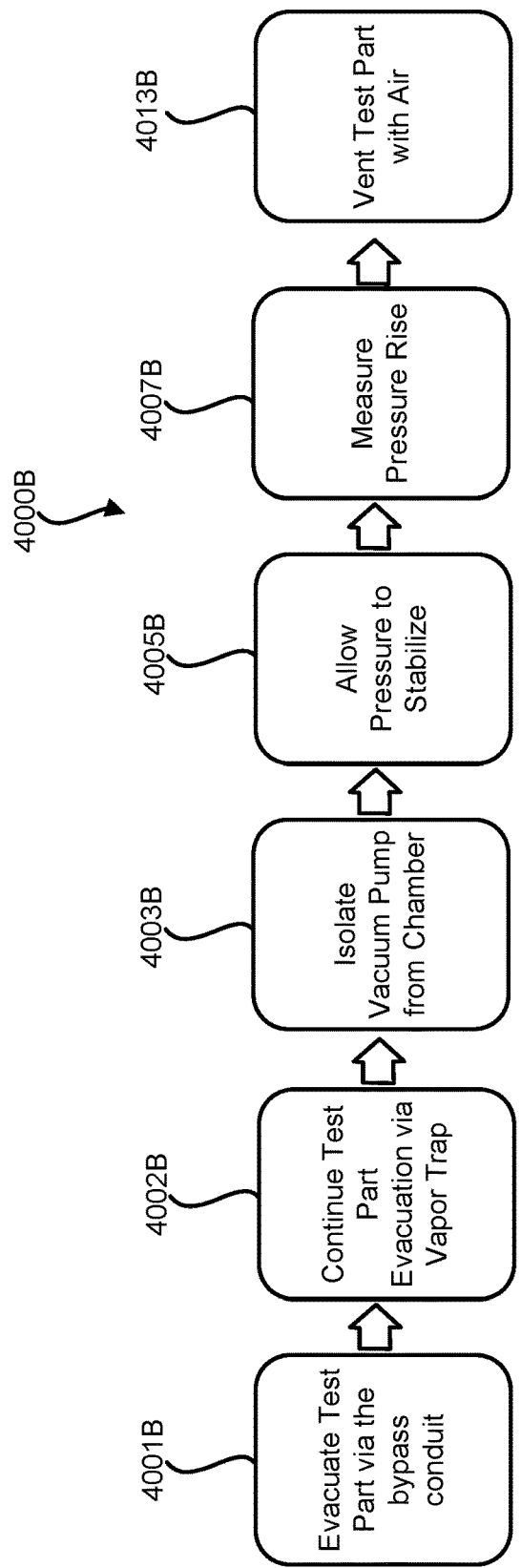
FIG. 9B is yet another schematic flow chart diagram of a method for leak testing, in accordance with various embodiments.

In various embodiments, FIG. 9B shows a method 4000B of leak testing that includes bypassing the vapor trap 451D to evacuate the test part (step 4001B). Bypassing the vapor trap 451D may be helpful to avoid using up the trap capacity when trapping condensable vapors is not needed, and saving the vapor trap capacity for trapping condensable vapors during the leak testing phase (e.g., while the pressure is being allowed to stabilize (step 4005B) or while measuring the pressure rise (step 4007B)). The method 4000B may further include continuing to evacuate the test part via the vapor trap 941D (step 4002B). Still further, the method 4000B may include isolating the vacuum source 941D from the test part (step 4003B) and allowing the pressure to stabilize (step 4005B). The method 4000B may further include measuring a potential pressure rise by the pressure transducer 931D (step 4007B) indicating a potential leak from the first volume 921D of the test part 901D (step 4007B). The method 4000B may also include venting the test part with air/nitrogen (step 4013B). While the steps of the method 4000B may occur in different orders, in various embodiments the steps of the method 4000B occur in the order depicted (or at least each step is initiated in the order depicted).

Figure 5:
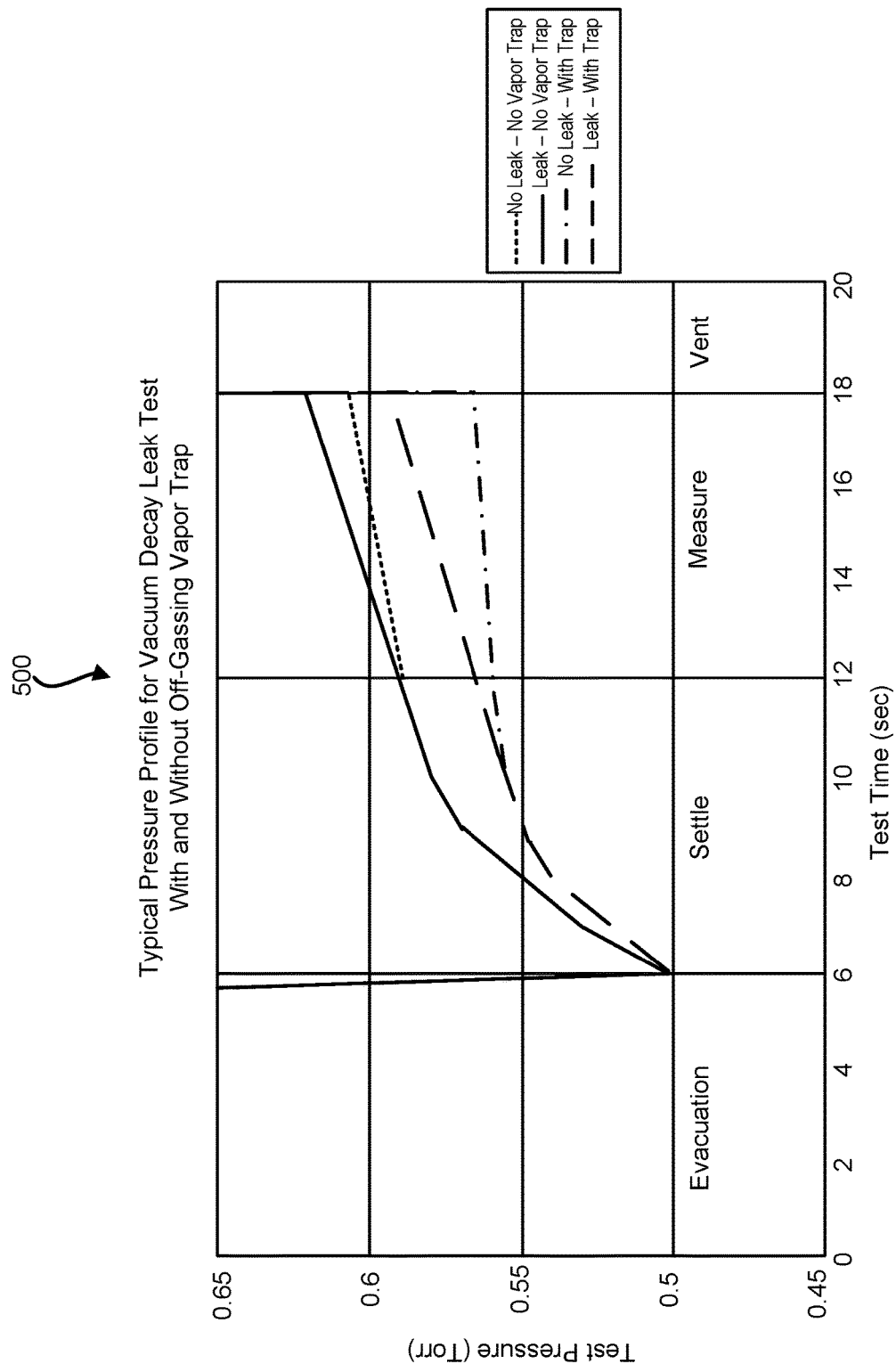
FIG. 5 illustrates a graphical representation of various exemplary pressure measurements, in accordance with various embodiments.

With reference to FIG. 5, a graphical representation 500 is provided of an exemplary pressure measurement during the various steps of the leak test process, indicating the advantages of the vapor trap as discussed herein, in creating greater signal separation between a non-leaking and a leaking test part. For example, it can be observed on the graph that the top two lines represent the difference between a part with no leak and a part with a leak, when there is no vapor trap used. Similarly, the bottom two lines represent the difference between a part with no leak and a part with a leak, when there is a vapor trap used. It will be observed that the difference, is greater when a trap is used. The difference also appears sooner (at 9 seconds, instead of at 12 seconds) on the chart in this example. This enhanced difference due to use of the vapor trap facilitates improved testing, faster testing, and more accurate test results. It will also be observed that the use of non-use of a vapor trap results in a significant difference in the pressure recorded for the same non-leaking part. This emphasizes the significant impact of off-gassing on leak testing (at least at vacuum levels of less than approximately 10 torr. As mentioned above the vapor trap may increase the signal to noise ratio of the leak test and thus may result in improved leak detection accuracy and/or decrease leak detection time.

Figure 6A:
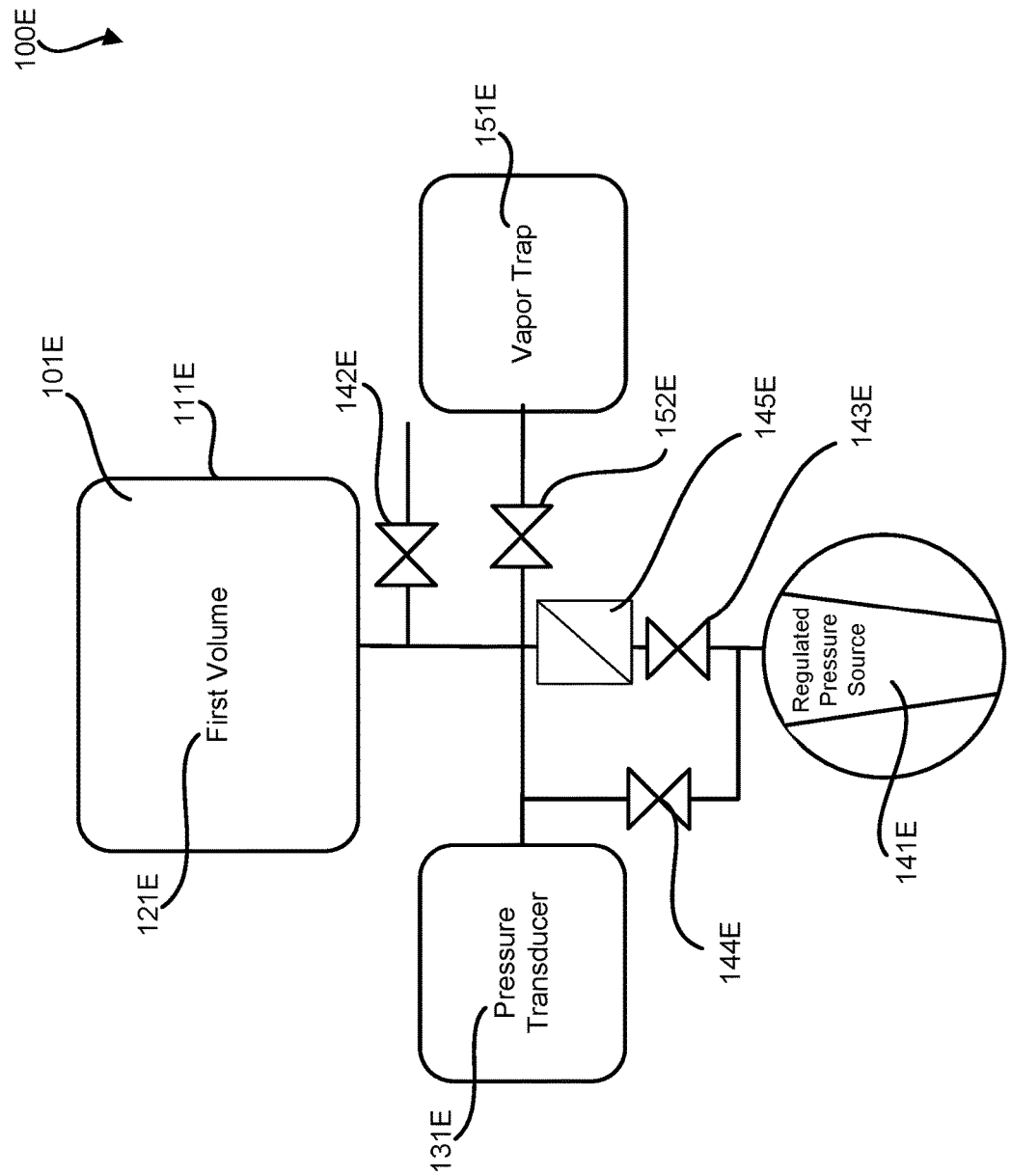
FIG. 6A is another schematic block diagram of an apparatus for leak testing, in accordance with various embodiments.

In various embodiments, FIG. 6A illustrates a schematic block diagram of leak testing apparatus 100E. The leak testing apparatus 100E has the pressure transducer 131E in fluidic communication with first volume 121E. As previously described, the first volume 121E has an interior volume of the test part 101E bounded by the test part boundary 111E. The first volume 121E may be in selectable fluidic communication with vapor trap 151E via vapor trap isolation valve 152E, and selectable communication with a vacuum source 141E via vacuum isolation valve 143E. A flow sensor 145E may be disposed in series between the vacuum source 141E and the first volume 121E. Bypass evacuation valve 144E may be disposed parallel to the series combination of the flow sensor 145E and the vacuum isolation valve 143E so that the pressure transducer 131E and first volume 121E may be directly connected to the vacuum source 141E and bypass the flow sensor 145E. Moreover, the first volume 121E may be in selectable fluidic communication with a vapor trap 151E via a vapor trap isolation value 152E, as well as an external gas source, such as ambient air, via an air inlet valve 142E.

Thus, the test part 101E may be connected to a manifold and may be evacuated through the bypass evacuation valve 144E to a specified vacuum level where a first quantity of the air is evacuated. In various embodiments, the first quantity of the air comprises most of the air (e.g., at least 50%, or at least 80%, or at least 95%, or at least 99%). The vapor trap 151E may then be connected to the system by opening the trap isolation valve 152E. The bypass evacuation valve 144E may be closed and the test part 101E then evacuated only through the vacuum isolation valve 143E and the flow sensor 145E. As the pressure equalizes across the flow sensor 145E, the net flow approaches zero, unless there is a leak in the test part 101E, upon which the flow of the leak is measured directly by the flow sensor 145E. Off-gassing of condensable vapors, which could give a false indication of a leak, are generally trapped by the vapor trap 151E rather than flowing through the flow sensor 145E.

Figure 6B:
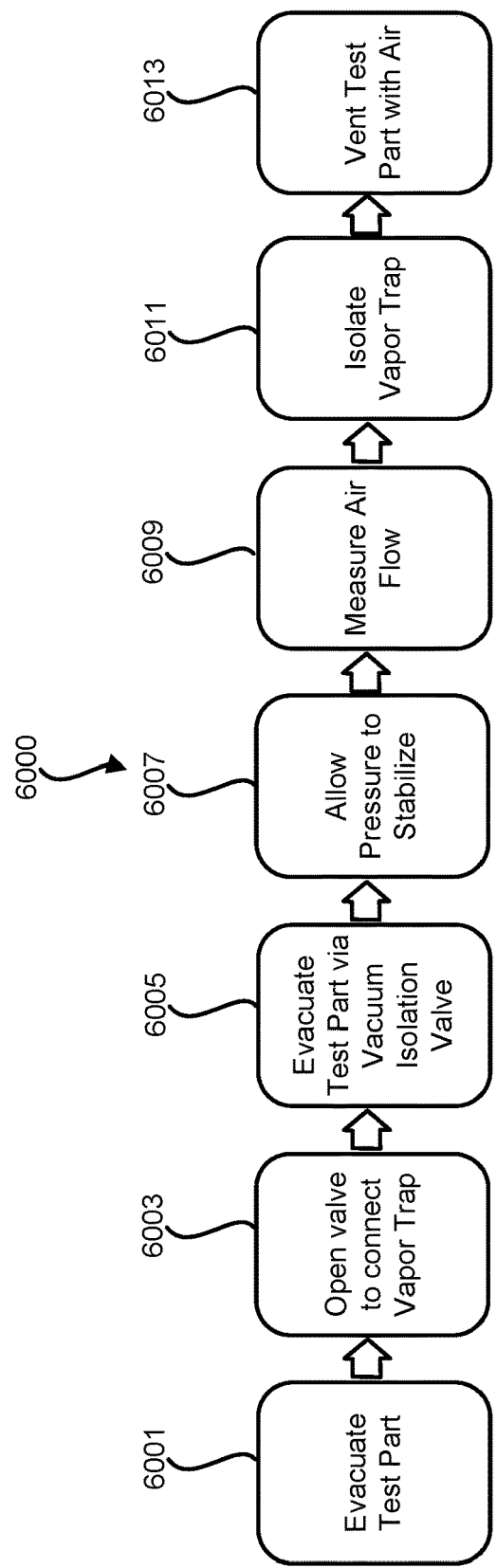
FIG. 6B is another schematic flow chart diagram of a method for leak testing, in accordance with various embodiments.

As such, as illustrated in FIG. 6B, a method 6000 of leak testing may include evacuating test part 101E via bypass evacuation valve 144E (step 6001). The trap isolation valve 152E may be opened, connecting the vapor trap 151E to the system (step 6003). The test part 101E may be evacuated by the vacuum source 141E via the vacuum isolation valve 143E (step 6005). Subsequently, the pressure may be permitted to stabilize (step 6007), and a potential air flow through the flow sensor 145E may be measured whereby a potential leak is detected (step 6009). In various embodiments, a calibration step may be performed to calibrate the flow sensor relative to a non-leaking part in order to establish an expected or baseline flow, against which the actual/measured flow rate is compared to determine whether or not a leak is present. Subsequently, the vapor trap 151E may be isolated by the vapor trap isolation valve 152E (step 6011) and the test part 101E may be vented, such as via an air inlet valve 142E (step 6013). While the steps of the method 6000 may occur in different orders, in various embodiments the steps of the method 6000 occur in the order depicted (or at least each step is initiated in the order depicted).

Figure 7A:
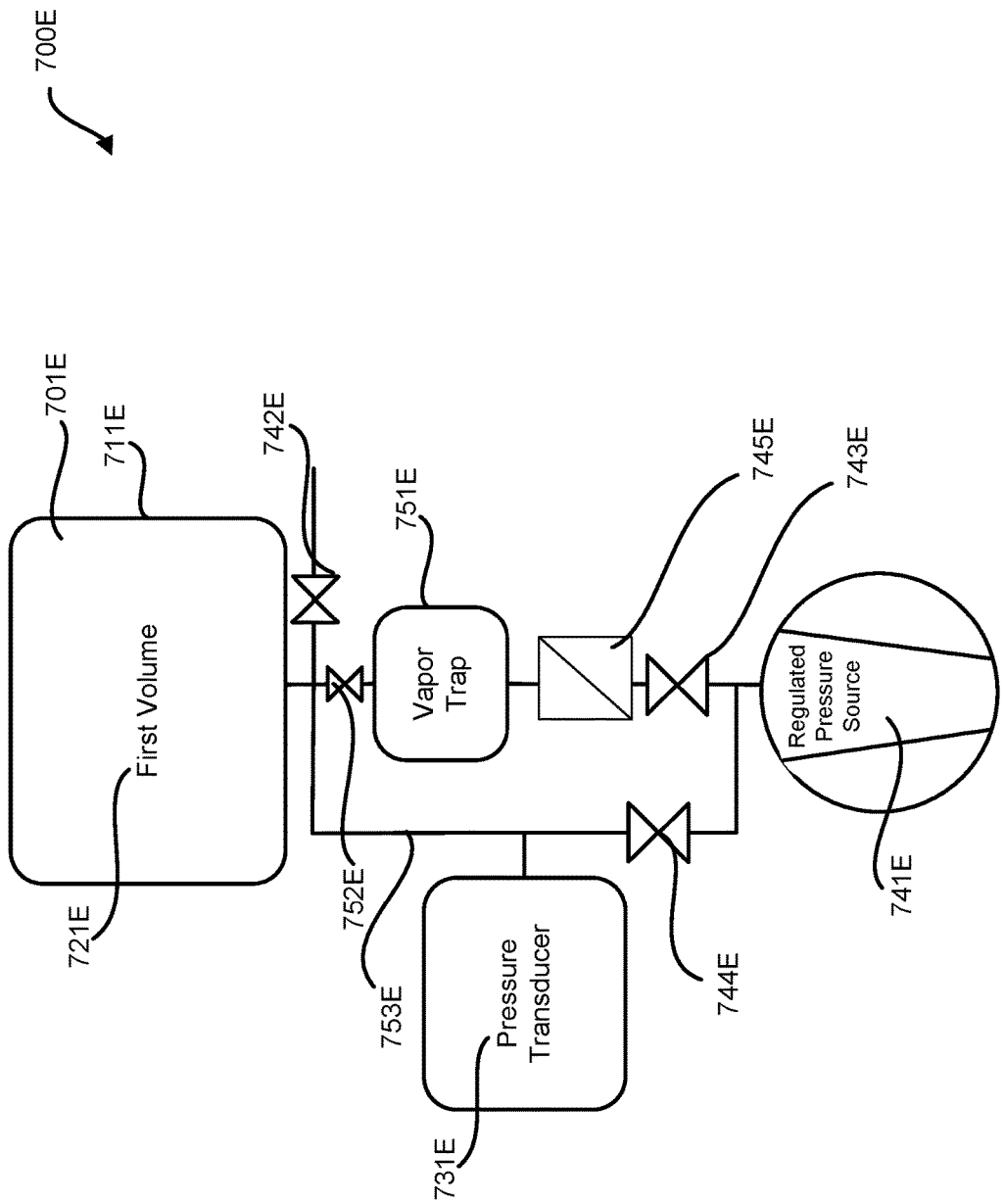
FIG. 7A is another schematic block diagram of an apparatus for leak testing, in accordance with various embodiments.

FIG. 7A, in accordance with various embodiments, shows the leak test apparatus 700E having bypass conduit 753E that bypasses both the flow sensor 745E and the vapor trap 751E, both of which may be configured "in-line" with each other and with the regulated pressure source 741E and the first volume 721E of test part 701E defined by test part boundary 711E. The pressure transducer 731E may be coupled in fluidic communication with the bypass conduit 753E. The first volume 721E may be in selectable fluidic communication with the vapor trap 751E and the flow sensor 745E via vapor trap isolation valve 752E. The first volume 721E may also be in selectable communication with the vacuum source 741E via the vapor trap isolation valve 752E and the vacuum isolation valve 743E (with the vapor trap 751E and the flow sensor 745E disposed between said two valves 752E, 743E). The first volume 721E may be in fluidic communication with an external gas source, such as ambient air or nitrogen, via air inlet valve 742E.

Thus, the test part 701E may be connected to a manifold and may be evacuated through the bypass conduit 753E to a specified vacuum level where a first quantity of the air is evacuated. In various embodiments, the first quantity of the air comprises most of the air (e.g., at least 50%, or at least 80%, or at least 95%, or at least 99%). The vapor trap 751E may be connected to the system by opening the trap isolation valve 752E. The bypass evacuation valve 744E may be closed and the test part 701E then evacuated only through the trap isolation valve 752E, the vapor trap 751E, the flow sensor 745E, and the vacuum isolation valve 743E. As the pressure equalizes across the flow sensor 745E, the net flow approaches zero, unless there is a leak in the test part 701E, upon which the flow of the leak is measured directly by the flow sensor 745E. Off-gassing of condensable vapors, which could give a false indication of a leak, are generally trapped by the vapor trap 751E rather than flowing through the flow sensor 745E.

FIG. 7B, according to various embodiments, shows a schematic flow chart diagram of a method 6000B of leak testing that includes evacuating a test part 701E via bypass conduit 753E (step 6001B). After a certain portion of the air/fluid has been evacuated, the test part 701E may be evacuated by the vacuum source 741E via valves 743E and 752E (step 6005B) (valve 744E is closed). Subsequently, the pressure may be permitted to stabilize (step 6007B), and a potential air flow through the flow sensor 745E may be measured whereby a potential leak is detected (step 6009B). Subsequently, the test part 701E may be vented, such as via an air inlet valve 742E (step 6013B). While the steps of the method 6000B may occur in different orders, in various embodiments the steps of the method 6000B occur in the order depicted (or at least each step is initiated in the order depicted). Throughout this document, when it is described that the "pressure may be permitted to stabilize", in an example embodiment, this may occur by allowing sufficient time for the flow to stabilize near zero for a non-leaking part or near the leak rate for a leaking part.

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A leak test apparatus comprising:
   a test chamber configured to receive a test part;
   a first pressure transducer coupled in fluidic communication to the test chamber;
   a vacuum source coupled in fluidic communication to the test chamber, wherein the vacuum source is configured to draw a vacuum on the test chamber;
   a vapor trap coupled in fluidic communication to the test chamber, wherein the vapor trap is configured to mitigate vapor off-gassing;
   a buffer tank coupled in selectable fluidic communication to the test chamber; and
   a second pressure transducer coupled in fluidic communication to the buffer tank.

2. The apparatus of claim 1, wherein the vacuum source is coupled in selectable fluidic communication to the test chamber.

3. The apparatus of claim 1, wherein the vapor trap is coupled in selectable fluidic communication to the test chamber.

4. The apparatus of claim 1, wherein the vapor trap is located in-line between the test chamber and the vacuum source such that the vacuum source is configured to evacuate the test chamber via the vapor trap.

5. The apparatus of claim 4, further comprising a bypass conduit, wherein the vacuum source is coupled in selectable fluidic communication to the test chamber via at least one of the vapor trap and the bypass conduit.

6. The apparatus of claim 1, further comprising a flow sensor coupled in fluidic communication to the test chamber.

7. The apparatus of claim 6, wherein the vacuum source is coupled in fluidic communication to the test chamber via the flow sensor.

8. The apparatus of claim 7, further comprising a bypass conduit, wherein the vacuum source is coupled in selectable communication to the test chamber via at least one of the flow sensor and the bypass conduit.

9. The apparatus of claim 1, wherein the vapor trap is configured to condense vapor from a substance present in the test chamber.

10. The apparatus of claim 1, wherein the vapor trap is configured to freeze vapor from a substance present in the test chamber.

11. The apparatus of claim 1, wherein the test chamber is specifically shaped to receive the test part to minimize volume between walls of the test chamber and the test part.

12. A leak test apparatus comprising:
    a test chamber configured to receive a test part;
    a pressure transducer coupled in fluidic communication to the test chamber;
    a vacuum source coupled in fluidic communication to the test chamber, wherein the vacuum source is configured to draw a vacuum on the test chamber;
    a vapor trap coupled in fluidic communication to the test chamber, wherein the vapor trap is configured to mitigate vapor off-gassing; and
    a flow sensor coupled in fluidic communication to the test chamber.

13. The apparatus of claim 12, wherein the vacuum source is coupled in fluidic communication to the test chamber via the flow sensor.

14. The apparatus of claim 13, further comprising a bypass conduit, wherein the vacuum source is coupled in selectable communication to the test chamber via at least one of the flow sensor and the bypass conduit.

15. The apparatus of claim 12, wherein the vapor trap is located in-line between the test chamber and the vacuum source such that the vacuum source is configured to evacuate the test chamber via the vapor trap.

16. The apparatus of claim 12, wherein the pressure transducer is a first pressure transducer, wherein the apparatus further comprises:
    a buffer tank coupled in selectable fluidic communication to the test chamber; and
    a second pressure transducer coupled in fluidic communication to the buffer tank.

17. The apparatus of claim 12, wherein the test chamber is specifically shaped to receive the test part to minimize volume between walls of the test chamber and the test part.

18. A leak test apparatus comprising: a test chamber configured to receive a test part; a pressure transducer coupled in fluidic communication to the test chamber; a vacuum source coupled in fluidic communication to the test chamber, wherein the vacuum source is configured to draw a vacuum on the test chamber; a vapor trap coupled in fluidic communication to the test chamber, wherein the vapor trap is configured to mitigate vapor off-gassing; wherein the vapor trap is located in-line between the test chamber and the vacuum source such that the vacuum source is configured to evacuate the test chamber via the vapor trap; and a flow sensor coupled in fluidic communication to the test chamber, wherein the vacuum source is coupled in fluidic communication to the test chamber via the flow sensor.

19. The apparatus of claim 18, wherein the pressure transducer is a first pressure transducer, wherein the apparatus further comprises:
    a buffer tank coupled in selectable fluidic communication to the test chamber; and
    a second pressure transducer coupled in fluidic communication to the buffer tank.

* * * * *